United States Patent
Blanchard

(10) Patent No.: US 8,210,324 B2
(45) Date of Patent: Jul. 3, 2012

(54) DEVICE FOR BRAKING AN ELONGATED ROTATING BODY, SUCH AS A ROTARY SHAFT, AND TRANSMISSION INTEGRATING SUCH A BRAKING DEVICE

(75) Inventor: Robert Blanchard, Le Chateau D'Olonne (FR)

(73) Assignee: France Reducteurs, Les Herbiers (FR)

( * ) Notice: Subject to any disclaimer, the term of this patent is extended or adjusted under 35 U.S.C. 154(b) by 1051 days.

(21) Appl. No.: 12/140,309

(22) Filed: Jun. 17, 2008

(65) Prior Publication Data
US 2008/0314696 A1 Dec. 25, 2008

(30) Foreign Application Priority Data
Jun. 20, 2007 (FR) ..................................... 07 04379

(51) Int. Cl.
*B62C 7/02* (2006.01)
(52) U.S. Cl. ....... 188/69; 188/71.4; 188/72.9; 188/70 R; 188/60; 188/31; 192/218; 192/66.2
(58) Field of Classification Search .................. 188/71.4, 188/72.9, 70 R, 69, 60, 31; 192/218, 66.2
See application file for complete search history.

(56) References Cited

U.S. PATENT DOCUMENTS

| | | | |
|---|---|---|---|
| 2,174,398 A | | 9/1939 | Farmer |
| 3,203,525 A | * | 8/1965 | Herbst ........................ 192/48.91 |
| 6,016,895 A | * | 1/2000 | Schwuger et al. ......... 192/53.34 |
| 6,119,824 A | | 9/2000 | McCallum |
| 6,834,751 B1 | * | 12/2004 | Magee ........................ 192/48.91 |
| 6,848,523 B2 | * | 2/2005 | Ishikawa et al. ............. 180/19.3 |
| 7,121,393 B1 | * | 10/2006 | Skipper et al. ............. 192/48.91 |
| 7,188,719 B2 | * | 3/2007 | Kerr ................................. 192/65 |
| 2003/0121750 A1 | * | 7/2003 | Teraoka ...................... 192/93 A |
| 2009/0032354 A1 | * | 2/2009 | Marsh et al. .................. 192/48.1 |

FOREIGN PATENT DOCUMENTS

DE 31 07 386 A1 12/1982
EP 0 051 971 A1 5/1982

* cited by examiner

*Primary Examiner* — Bradley King
*Assistant Examiner* — Mahbubur Rashid
(74) *Attorney, Agent, or Firm* — Young & Thompson

(57) ABSTRACT

A device for braking an elongated rotating body, includes at least two parts with coaxial conical surfaces, able to be slipped onto the body, and one, a so-called male cone, mounted integrally in rotation with the body, and the other, a so-called female cone, mounted fixed in rotation relative to the body. The female cone assumes the shape of a wheel with an axial bore with a conical bearing, and the male cone has a center recess. The cones are controlled in terms of axial relative movement by a control element. The male cone is, when the cones are close to one another, corresponding to the braking position, housed inside the axial bore of the female cone, with its conical external peripheral surface being held, by contact with a support, with the conical bearing of the female cone.

19 Claims, 5 Drawing Sheets

DEVICE FOR BRAKING AN ELONGATED ROTATING BODY, SUCH AS A ROTARY SHAFT, AND TRANSMISSION INTEGRATING SUCH A BRAKING DEVICE

This invention relates to a device for braking an elongated rotating body, such as a rotary shaft, as well as a transmission that integrates such a braking device.

It relates more particularly to a braking device of the type that comprises at least two parts with coaxial conical surfaces that can be slipped onto said body and mounted—one, so-called male cone, integrally in rotation with said body, and the other, so-called female cone, fixed in rotation relative to said body—whereby the female cone assumes the shape of a wheel with an axial bore with a conical bearing and the male cone has a center recess to be able to be slipped onto said body, whereby the female cone and the male cone are controlled in terms of axial relative movement in the direction of drawing-together or separation by means of a control element, whereby the male cone is, when said cones are close to one another, corresponding to the braking position, housed inside the axial bore of the female cone, with its conical external peripheral surface being held, by contact with a support, with the conical bearing of the female cone.

Such so-called friction braking devices are well known to those skilled in this art. In general, such devices are, in the case of a transmission for a self-propelled machine or device with a walking or riding driver, such as a lawnmower or snowplow, placed outside of the box, whereby this box at least partially houses an engine input shaft, at least one output shaft, such as a wheel driving shaft of the machine or the device, and the elements for transmission of movement between said input and output shafts.

Actually, such braking devices are either placed on the portion of the wheel driving shaft that is outside of said box, close to the wheels of the device or the machine, or on the upstream portion of the input shaft that corresponds to the one that is outside of the box.

In each case, such devices consist of two elements that can be separated from one another or drawn together by means of a control element, whereby the braking is carried out, when said elements such as disks or cones are close to one another, by friction contact between said elements.

Such a design has various drawbacks. Actually, for an adequate effectiveness, it is necessary that the friction surfaces be large. In such a configuration, however, the effectiveness does not increase in a proportional manner with the increase in surface area. On the contrary, the surface area increases much faster than the effectiveness, such that a large space requirement of the unit results therefrom.

Furthermore, the large friction elements are generally much more expensive than the smaller friction elements, not encouraging the dimensions of such elements to be increased.

Finally, such braking devices can be placed in various and varied environments, such as an environment that is formed by plastic parts whose mechanical strength is weak, such that the stresses of such parts are to be reduced to a minimum.

A braking device in which there is provided a coil that comprises conical surfaces on which two so-called female cones, which each come in the form of a wheel with a conical bore, are mounted is also known from the patent U.S. Pat. No. 2,174,398. Because of the production in coil form of one of the parts, the female cones cannot be slipped onto the body that is to be braked, which makes it necessary that the female cones each be made in at least two parts with a radial joint plane so that they can be placed between the conical sides of the coil. A complexity results, on the one hand, from the production of the coil-type part whose machining seems difficult, and even impossible, in particular for economical and technical reasons; on the other hand, assembly of the female cones and then tedious operations, in particular screwing, are to be carried out.

A braking device with two male cones and one female cone is known from the patent EP-0,151,971. In such a configuration, either the environment, in particular the walls of the box that contains the braking device, is stressed during the braking, or two control mechanisms of the brake are necessary, making the structure of the device complex.

Finally, a braking device where each brake element comprises at least two conical bearings such that the structure of the device is very complex is known from the German Patent DE 3,107,386.

One object of this invention is to propose a device for braking an elongated rotating body, such as a rotary shaft, of the above-mentioned type, whose design makes it possible to increase the effectiveness of the braking without significantly increasing the cost and the space requirement of such a device.

Another object of this invention is to propose a braking device whose design makes it possible to produce the device in the form of a ready-to-assemble unit with a field where the forces are applied in a closed circuit.

Another object of this invention is to propose a braking device of the above-mentioned type, whose design allows a facility of assembly due to the versatility of certain elements.

For this purpose, the invention has as its object a device for braking an elongated rotating body, such as a rotary shaft, of the type that comprises at least two parts with essentially coaxial conical surfaces, able to be slipped onto said body, and one, a so-called male cone, mounted integrally in rotation with said body and the other, a so-called female cone, mounted fixed in rotation relative to said body, whereby the female cone assumes the shape of a wheel with an axial bore with a conical bearing, and the male cone, preferably of a generally tapered shape, has a center recess so that it can be slipped onto said body, whereby the female cone and the male cone are controlled in terms of axial relative movement in the direction of drawing-together or separation by means of a control element, whereby the male cone is, when said cones are close to one another, corresponding to the braking position, housed inside the axial bore of the female cone, with its conical external peripheral surface being held, by contact with a support, with the conical bearing of the female cone, characterized in that the device comprises at least two pairs of cones that are each formed by a male cone and a female cone and in that the control element is common to the two pairs of cones.

The fact of equipping such a braking device—no longer with a single pair of cones but with at least two pairs of cones—makes it possible to reduce the size of the cones that constitute each pair of cones with an increased effectiveness of the device.

Furthermore, it is generally less expensive to use two pairs of small cones by comparison to a single pair of large cones.

The cones of the two pairs of cones are made in the form of independent separate parts. Because of the independence of said cones to one another, each male or female cone is made from a single part such that the female cones can be placed between the male cones before assembling said male cones between one another. The result is a simplification of production of the braking device.

In a preferred embodiment of the invention, the male cones are clamped together with a space between them and define with one another an interval of fixed maximum length inside of which the female cones are housed, whereby the control element forms a spacer that is inserted between said female cones.

By clamping together with spacing in-between, it is understood that the male cones, which are made in the form of separate parts, are connected and held together by a connecting means, such as a strap, screw or the like, preventing a spacing of the cones beyond a predetermined value.

The presence of an interval of fixed maximum length makes it possible to contain the stresses that are applied by the control device to the cones in the braking phase and thus make it possible to keep, for example, the walls of the box, inside of which the braking device is housed, from being subjected to any stress due to a field where the forces are applied in a closed circuit.

Thus, the lateral walls of the box are absolutely not stressed during the tightening or releasing of the cones resulting from the braking actions.

Such an arrangement therefore makes it possible to obtain a braking device in the form of a ready-to-assemble unit that can be positioned at any location of the elongated rotating body that carries the braking device.

In addition, according to the type of clamping-together that is adopted, the result is an automatic holding of the cones in a coaxial arrangement of their conical surfaces.

Finally, owing to the clamping-together that involves a production in the form of two separate pails of male cones, the design of the female cones is simplified.

According to a preferred arrangement of the invention, the female cones are controlled in terms of axial movement and kept from rotating by the common control element.

Thus, the common control element is a multi-function element that makes it possible, on the one hand, to control the axial movement of the female cones, and, on the other hand, to keep said cones from rotating.

The result is a simplication of assembly of the braking device since it is not necessary to use elements of the environment to keep the female cones from rotating relative to the elongated rotating body, such as a rotary shaft.

According to a preferred arrangement of the invention, the external peripheral surface of the male cone and the conical bearing of the female cone of the cones of each pair of cones have a slope that is identical or approximately identical to the angle α that is selected within the range [5°-30°], preferably [5°-20°].

Owing to this arrangement, the effectiveness of the braking is improved. Actually, the smaller the angle α, the greater the effectiveness of the braking. The selection of an angle α within the above-mentioned range thus allows a direct metal/metal contact between said male and female cones of a pair of cones without having to insert a friction fixture that would cause faster wear of the braking device.

The invention also has as its object a transmission for a self-propelled machine or device of the type that comprises a box, and—housed at least partially inside the box—at least one engine input shaft, an output shaft, such as a wheel driving shaft of the machine or device, and means for transmission of movement between the input shaft and the output shaft, characterized in that the transmission also comprises, contained inside the box and acting on the input shaft or on the output shaft or on the transmission means, at least one braking device of the above-mentioned type.

Owing to the design of the braking device, the latter can be housed completely within the box without hampering the space requirement of the unit.

The invention will be better understood from reading the following description of embodiments, with reference to the accompanying drawings, in which.

Figure 1:
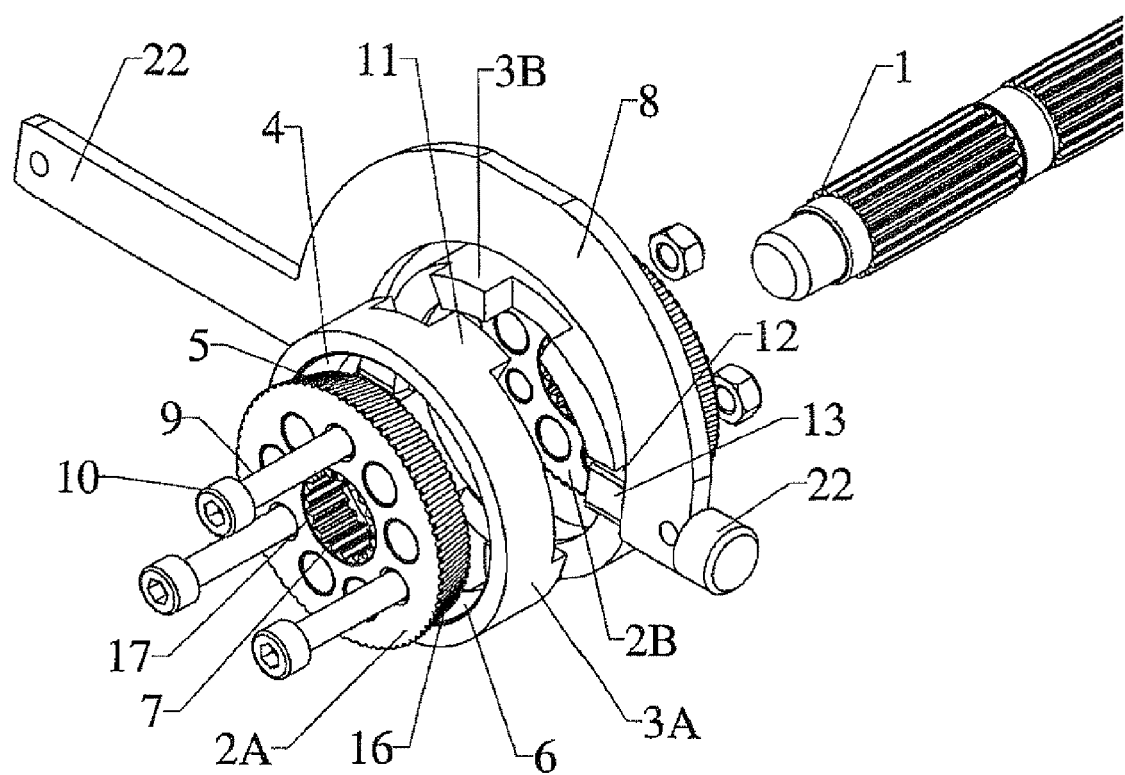
FIG. 1 shows a perspective view of a braking device according to the invention that is ready to be slipped onto the braking shaft.
Figure 2:
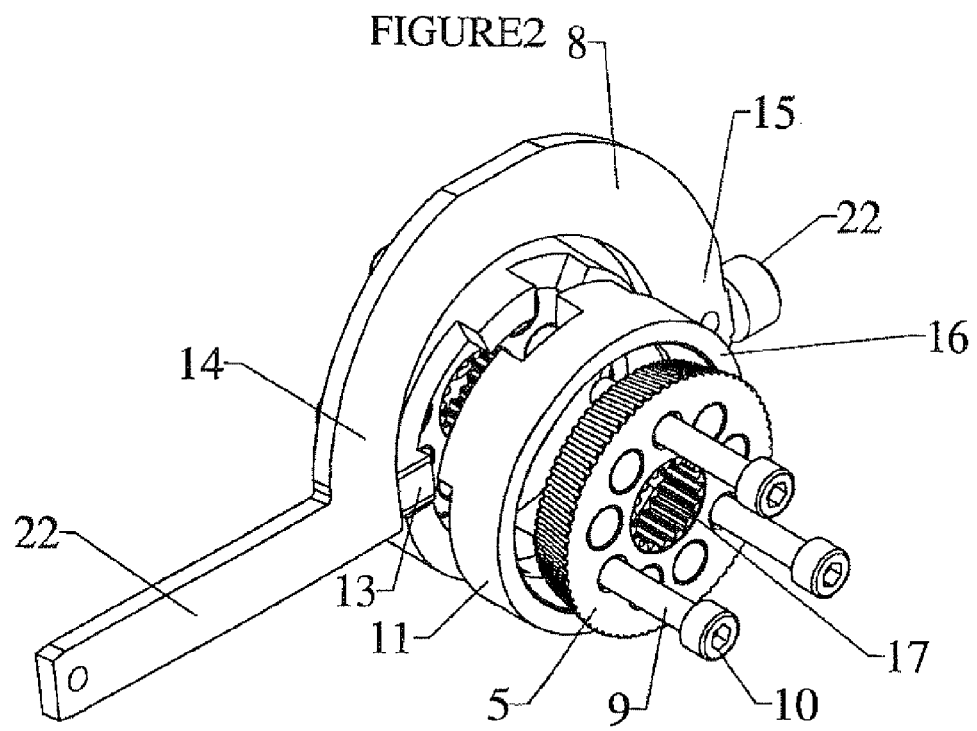
FIG. 2 shows, taken under another angle, a perspective view of the braking device shown in FIG. 1.

As mentioned above, the braking device, object of the invention, is more particularly designed to allow the braking of an elongated body 1, such as a rotary shaft.

In the examples shown, this braking device is applied more particularly to a transmission that comprises a box 18, and—housed at least partially inside the box 18—at least one engine input shaft 19, an output shaft 20, such as a wheel driving shaft of the self-propelled wheeled machine or device in which the transmission is applied, and means for transmission of movement between the input shaft 19 and the output shaft 20.

The braking device is contained inside the box 18, generally formed by two half-shells that are assembled by a joint plane. This braking device acts just as well on either the input shaft 19 or on the output shaft 20 or on the means for transmission between input shaft 19 and output shaft 20.

In the case of a complex transmission of the type of the one shown, whereby this transmission integrates, close to the input shaft, a direction-reversing device, and, close to the wheel driving output shaft, a differential, the braking device can be carried by an intermediate shaft of the transmission that constitutes one of the means of transmission of movement between the input shaft and the output shaft of the transmission.

Independently of its application, the braking device, object of the invention, comprises at least two parts 2A, 3A with a surface 5, 6 that are conical in coaxial arrangement. These two parts 2A, 3A are able to be slipped onto the body 1 that is to be braked, in this case the rotary shaft 1.

One of the parts, a so-called male cone that is shown at 2A in the figures, is mounted integrally by rotation of the body 1. The other part, shown at 3A in the figures and called a female cone, is mounted fixed in rotation relative to the body 1 that is to be braked.

In the examples that are shown, the female cone 3A assumes the shape of a wheel with an axial bore 4 with a conical bearing 6, while the male cone 2A of generally tapered shape has a center recess so that it can be slipped onto the body 1 that is to be braked. The central recess 7 of the male cone 2A is a circular recess that is centered or organized around an axis that corresponds to the axis around which the conical surfaces of the male and female cones are in a coaxial arrangement. In an equivalent manner, the male cone 2A would have been able to assume a generally conical shape.

Henceforth, as heretofore, in each case the conical surfaces could therefore be tapered or not without exceeding the framework of the invention.

The female cone 3A and the male cone 2A are controlled by axial relative movement in the direction of a drawing-together or a separation by means of a control element 8.

When said cones 2A, 3A are close to one another, corresponding to the braking position, the male cone 2A is housed inside the axial bore 4 of the female cone 3A, with its conical external peripheral surface 5 being held, by contact with a support, with the conical bearing 6 of the female cone 3A. The conical external peripheral surface 5 of the male cone 2A or 2B and the conical bearing 6 of the female cone 3A or 3B have a slope that is identical or approximately identical to the angle α that is preferably selected within the range 5-20°. These surfaces 5 and 6 of the cones of a pair of cones are therefore approximately parallel to one another, whereby the angle α corresponds in each case to the angle that is formed by the external peripheral surface 5 or the conical bearing 6 with the axis of rotation of the male cones.

In a manner that is characteristic of the invention and as the figures illustrate, the device comprises at least two pairs of cones 2A, 3A and 2B, 3B that are each formed by a male cone 2A, 2B and a female cone 3A, 31B, and the control element 8 is common to the two pairs 2A, 3A and 2B, 3B of cones.

In the examples shown, the female cones 3A, 3B are inserted between the male cones 2A, 2B and are controlled by axial movement by the common control element 8 that is placed between said female cones 3A, 3B.

The face of the male cones that form the base of each cone constitute the external faces of this Juxtaposition.

Each male or female cone is a metallic part that is made from a single part. Each cone is made independently of another cone of the device. Thus, the braking device comprises two male cones that are made in the form of two separate parts and two female cones that are also made in the form of two separate parts.

Preferably, the male cones 2A, 2B are clamped together with a space between them and define with one another an interval of fixed maximum length inside of which the female cones 3A, 3B are housed. The control element 8 forms a spacer that is inserted between the female cones 3A, 3B. Actually, for braking, the control element 8 acts simultaneously by pushing each of the female cones 3A, 3B to bring them close to the male cones 2A, 2B with which they are associated.

Various embodiments of the means for clamping together the male cones with a space between them can be considered. Thus, the clamping means can consist of, for example, axial stops of the pin type that are carried by the elongated rotating body 1 that is to be braked.

In a preferred embodiment, the male cones 2A, 2B are connected to one another by means of parallel rods 9 along which the male cones 2A, 2B slide in the direction of a drawing-together or a spacing from one another, whereby the rods 9 are provided, at each of their ends, with an axial stop 10 that forms a clamping means with a space between the cones 2A, 2B.

Thus, the rods, as shown, are equipped at one of their ends with a head like a screw and are provided on the other end with a threading that is designed to work with a nut that forms an axial stop, in the threaded state of the nut on said rod 9. The face of each male cone forms the base of said cone that rests against an axial stop 10 because of the orientation of the male cones whose conical surfaces have the appearance of converging from the outside toward the inside of the interval formed by said cones. It is noted that the female cones quite obviously have an orientation of their conical surface that is identical to that of the male cones.

The production of the axial stops in the form of elements that are positioned on the ends of the rods 9 makes it possible, thanks to the presence of the rods 9, to hold male and female cones in a coaxial arrangement. Furthermore, these rods allow the production of the braking device in the form of a ready-to-assemble unit because these rods make it possible to keep assembled between them all of the elements that constitute the braking device, in particular cones of this device.

Finally, owing to the fact that the clamping means are applied to cones and not the body 1 that is to be braked, the braking device can be positioned at any location on the elongated rotating body 1 to be braked that carries it.

In a general manner, the presence of these clamping means makes it possible, when the female cones are stressed by spacing, as will be described later, to obtain a braking action, to use a field where the forces are applied in a closed circuit such that the male cones do not rest on surrounding parts, thus limiting the mechanical stressing of the parts that are located in the environment of the male cones.

To simplify also the construction of such a braking device, the female cones 3A, 3B are controlled in terms of axial movement and kept from rotating by the common control element 8. This control element 8 is therefore a multi-function element that serves both to control the axial movement of the female cones and to keep these same cones from rotating. This thus makes it possible to remove connecting elements of the female cones with surrounding elements to keep the latter from rotating.

In the example that is shown in the figures, the wheels that constitute female cones 3A, 3B carry, on their opposite faces, teeth 11 that form a circular serration. The teeth 11 of said serrations interlock by providing between them a free space 12 for inserting a portion 13, a so-called active control portion 13, of the common control element 8.

This common control element 8 is an angular movement control element that assumes, here, the shape of a fork with two branches 14, 15. Each branch 14, 15 of the fork is provided with an internal radial tooth that forms the active control portion 13 of the common control element 8.

Thus, in the example that is shown, the fork body assumes the shape of a C or a U. The branches of said control element 8 are formed by the zone that is contiguous to the free ends of C or by the branches of the U.

In each case, these branches are equipped with an internal radial tooth 13 that can be housed in the space that is left free between the sides of two teeth 11 of the serrations that are respectively carried: one by the female cone 3A and the other by the female cone 3B.

In the examples that are shown, the fork is provided only with two internal radial teeth that are positioned in a diametrically opposite manner to the control element 8. These internal radial teeth extend axially here and externally to said control element 8 to form two segments of a square- or circular-section shaft, shown at 22 in the figures. These shaft segments 22 are designed to be housed inside of bearings 21 that are located in the gearbox 18 in the case of an application of the braking device with a transmission as mentioned above.

The control element 8 is then moved in rotation by means of a control lever that is positioned outside of the box and becomes engaged with one of the branches 22 of said control element 8.

The angular movement of the control element 8 brings about a spacing of the female cones 3A, 3B. This spacing is obtained by the active surfaces of the internal radial teeth 13 of the control element 8 resting along the sides of the teeth 11 of the serrations of the female cones 3A, 3B.

It is noted that the axis of rotation of the control element that allows an angular movement of the latter extends approximately orthogonally to the axis around which the conical surfaces of the male and female cones are arranged in a coaxial arrangement, whereby this axis corresponds to the axis of rotation of the elongated rotating body 1 that is to be braked or else to the median longitudinal axis of the circular central recess 7 of each male cone.

Actually, the male and female cones have conical surfaces with a coaxial arrangement relative to the axis of rotation of the elongated rotating body 1 that is to be braked merged with the mounted state of the braking device on the body 1 with the median longitudinal axis of the central recess 7 of each male cone.

Likewise, the rods 9, as described above, which connect the male cones 2A, 2B to one another, extend approximately parallel to this same axis of rotation of the elongated rotating body 1 that is to be braked.

The female cones 3A, 3B that are controlled in movement by means of the element 8 are driven by a relative axial movement along an axis that is parallel to the axis of rotation of the elongated body 1 that is to be braked.

To enhance the engagement of the conical surfaces 5 and 6 of the male and female cones, the conical external peripheral surface 5 of each male cone 2A, 2B is provided with ridges 16. The presence of these ridges also makes it possible to reduce the wear of the male cones, whereby this premature wear is caused by contact between said conical surfaces.

So that it engages by rotation with the rotating body 1, each male cone 2A, 2B is provided, in its central recess 7, with axial grooves 17 that can work with additional grooves located on said body I that is to be braked.

As mentioned above, the braking device, object of the invention, can come in the form of a ready-to-assemble unit.

For this purpose, the male cones 2A, 2B and the female cones 3A, 3B are each slipped onto the rods 9 that are used in the connection of the male cones to one another. To allow such a slipping of the male cones onto the rods, the male cones have through orifices that connect the base and the top of the male cones. By its axial bore, each female cone surrounds the rods connecting the male cones to one another. This introduction on the rods is carried out in a predetermined order so as to obtain a male cone, then two female cones, followed by a male cone. Once this stacking or juxtaposition is carried out on the rods, a nut is screwed onto the end of said rods to constitute an axial stop 10, whereby the opposite end of the rod carries a head that also forms an axial stop 10 of one of the male cones.

The control element 8 can then be positioned between the female cones and held in position by friction contact with the teeth 11 of the female cones. This unit can then be slipped onto the body 1 that is to be braked. The engagement by rotation of the male cones with the body 1 that is to be braked is carried out automatically by cooperation of the axial grooves that are located in the central recess 7 of the male cones with the additional grooves that are located on the body 1. The device is then ready to operate.

The control by movement of the female cones in the direction of a spacing of said female cones that cause a drawing-together of these female cones with the male cones is carried out by simple rotation of the control element around an axis that is orthogonal to the axis of rotation of the body 1 that is to be braked.

During this angular movement of the control element 8, the female cone 3A tends to move toward the male cone 2A, while the female cone 3B tends to move toward the male cone 2B. In the position where they are closest together, the conical surface 5 of the male cone 2A is in contact with a support with the conical bearing 6 of the female cone 3A. It is the same for the pair of cones 2B, 3B.

Figure 3:
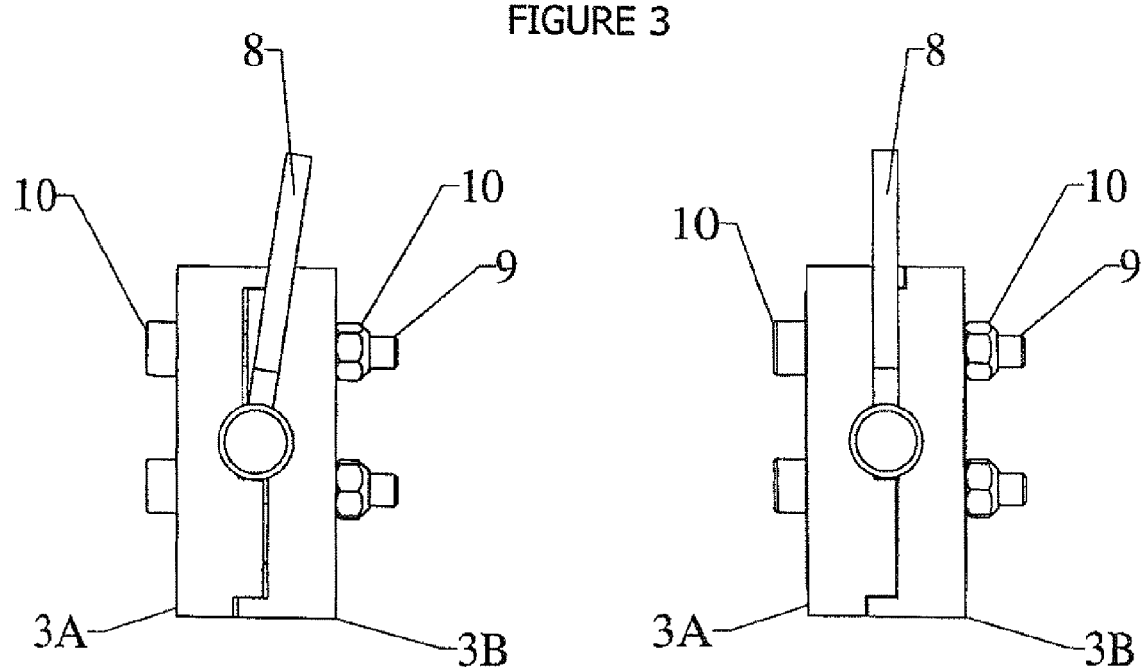
FIG. 3 shows in particular two top views of a braking device according to the invention, whereby the left view corresponds to the braking position (male and female cones of the device that are tightened or brought close together), and the right view corresponds to an unbraked position (male and female cones of the device separated)
Figure 4:
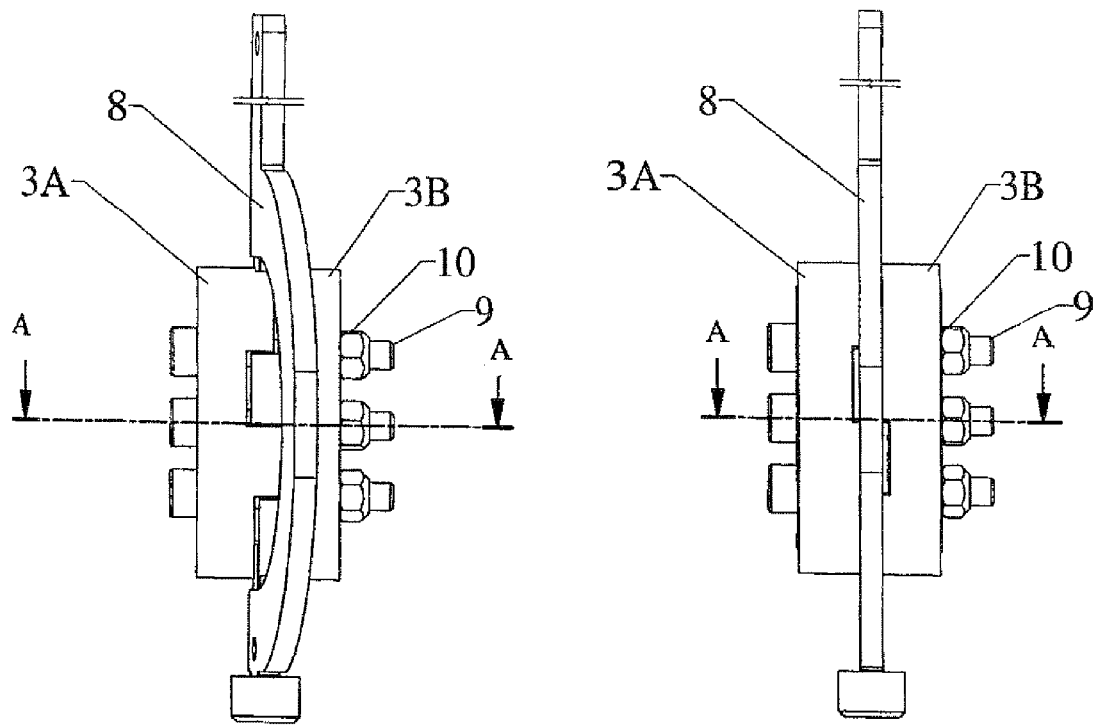
FIG. 4 shows in parallel two front views from the fork side of a device according to the invention, whereby the left view corresponds to the tightened brake position, and the right view corresponds to the released brake position of the device.
Figure 5:
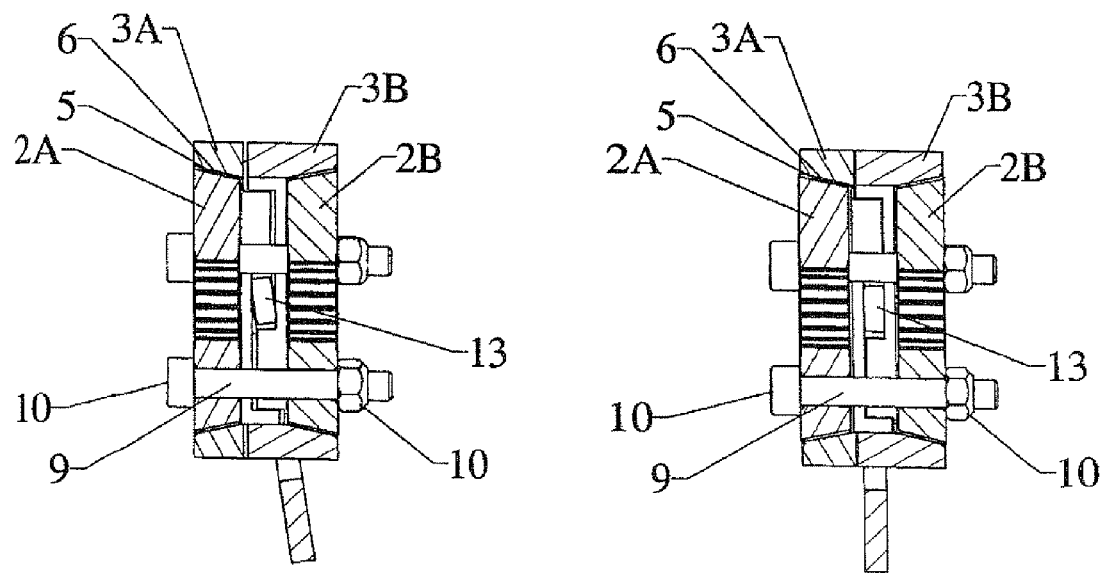
FIG. 5 shows in parallel two cutaway views along NA of the views of FIG. 4.
Figure 6:
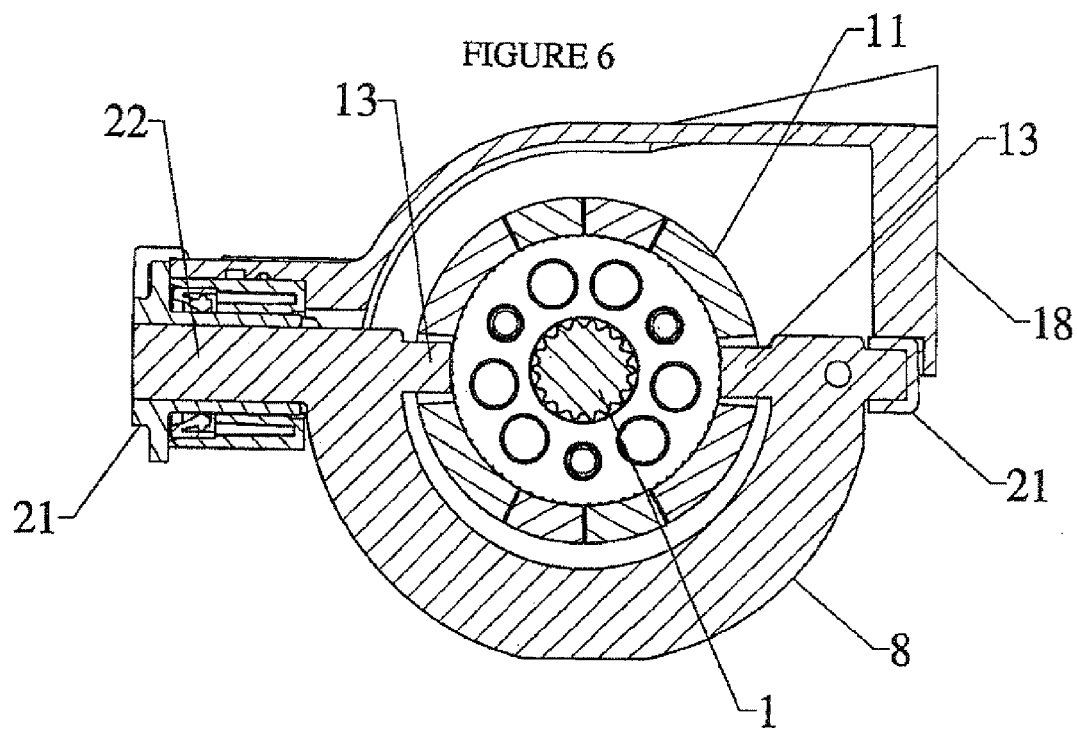
FIG. 6 shows a cross-sectional view from the control element of a braking device according to the invention.
Figure 7:
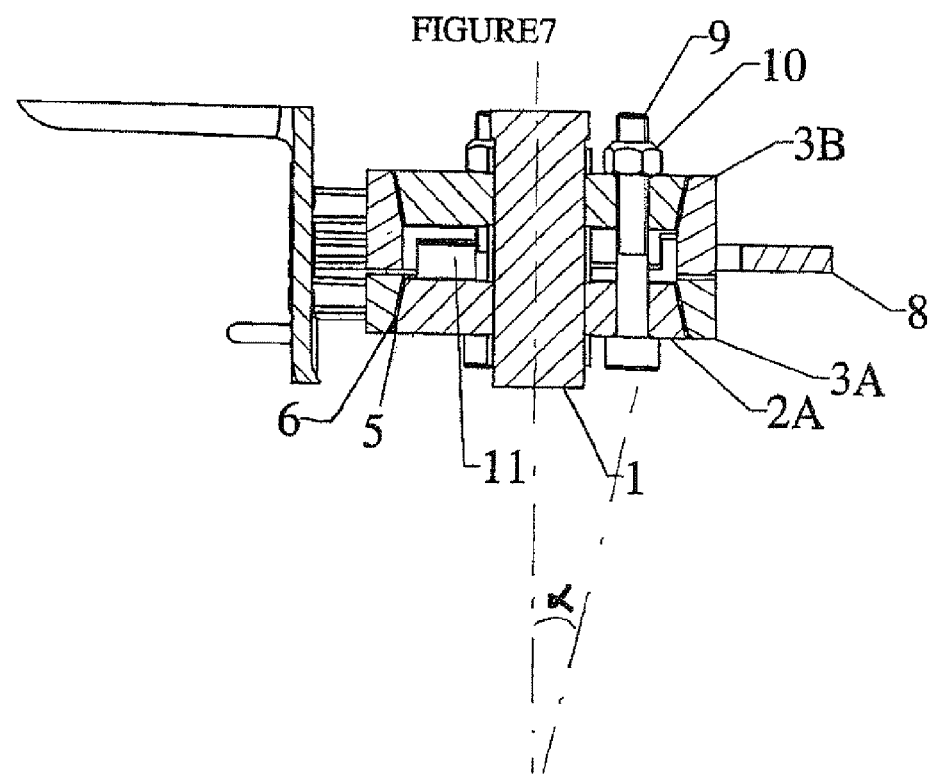
FIG. 7 shows a partial median longitudinal cutaway view of a braking device according to the invention, housed inside a gearbox.
Figure 8:
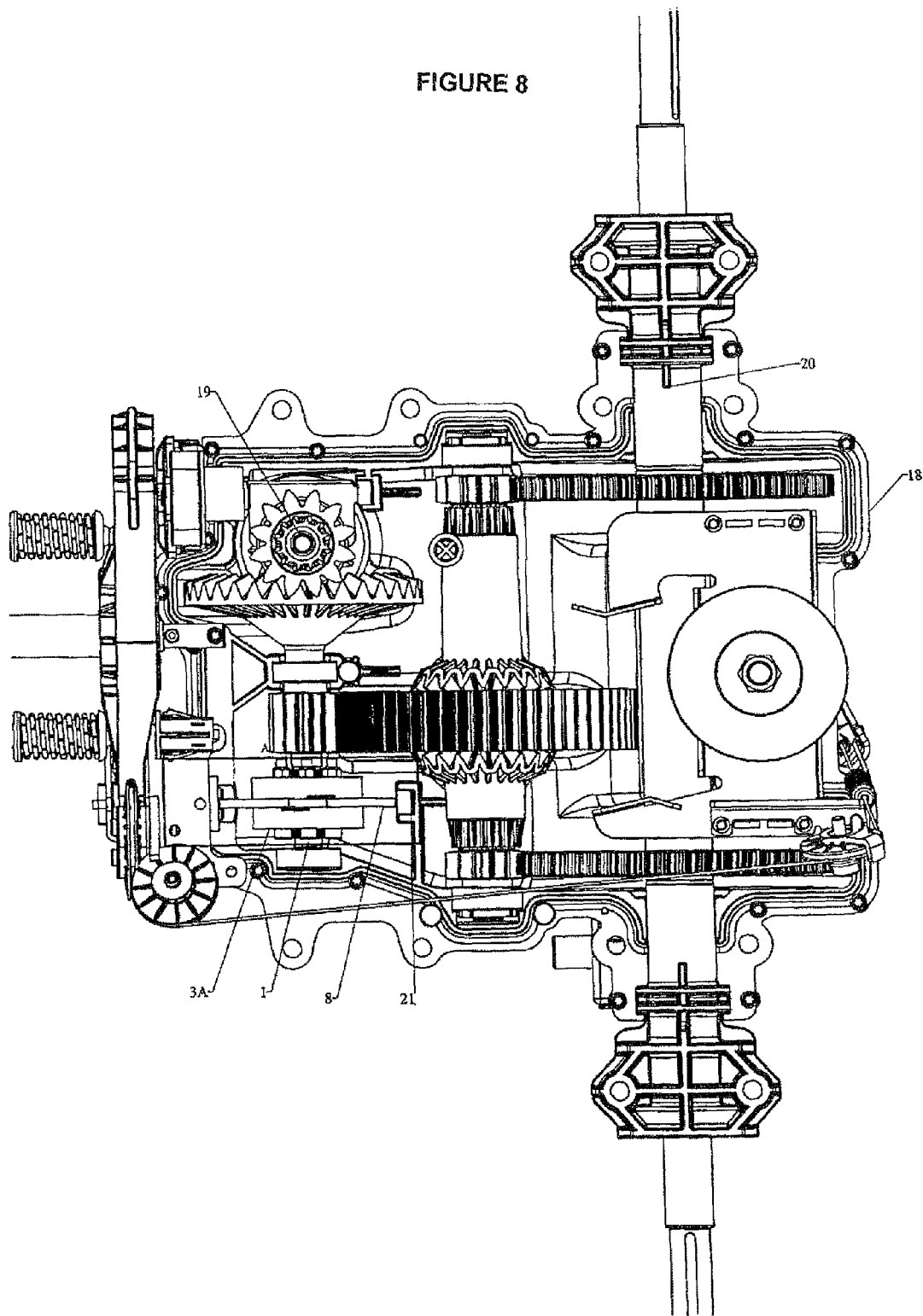
FIG. 8 shows a partial perspective view of a transmission that integrates a braking device according to the invention, whereby one of the elements of the box that constitutes the gearbox has been removed to allow a display of the elements.

In this position that is in accordance with the one shown in the left views in FIGS. 3, 4 and 5, the conical surfaces 5 and 6 of the male and female cones are in contact with a support such that the body 1 is braked. To allow a releasing of the brake, it is enough to move the control element angularly in an opposite direction, as the right views in FIGS. 3, 4 and 5, in which the braking device is shown in released position, illustrate.

It is noted that the passage from the braked position to the released position of the brake and vice versa involves only an axial movement of several millimeters along the shaft or rotating body 1 that is to be braked of the female cones 3A, 3B. This movement corresponds approximately to the action that is shown between the female cones 3A, 3B in the left view of FIG. 5.

The invention claimed is:

1. Device for braking an elongated rotating body (1), the device comprising:
   a male cone (2A) and a female cone (3A), both with essentially coaxial conical surfaces (5,6) and both adapted to be slipped onto said body (1), and one (2A), the male cone (2A) being mounted integrally in rotation with said body (1), the female cone (3A) being mounted fixed in rotation relative to said body (1),
   the female cone (3A) having the shape of a wheel with an axial bore (4) with one of said coaxial conical surfaces (6), and the male cone (2A) having a generally tapered shape with a center recess adapted to be slipped onto said body (1); and
   a control element (8) that controls the female cone (3A) and the male cone (2A) by axial relative movement in the direction of drawing-together or separation of the male and female cones,
   wherein the male cone (2A) is, when the male and female cones (2A, 3A) are close to one another, corresponding to the braking position, housed inside the axial bore (4) of the female cone (3A), with said coaxial conical surface (5) of the male cone being held, by contact with a support, with said coaxial conical surface (6) of the female cone (3A), and
   wherein the device comprises at least two pairs of cones (2A, 3A; 2B, 3B), wherein the male (2A, 2B) and female (3A, 3B) cones form each of the two pair of cones and wherein said control element (8) is common to said two pairs (2A, 3A; 2B, 3B) of cones.

2. Device for braking an elongated rotating body (1) according to claim 1, wherein the female cones (3A, 3B) are inserted between the male cones (2A, 2B) and are controlled by axial movement by the common control element (8) that is placed between said female cones (3A, 3B).

3. Device for braking an elongated rotating body (1) according to claim 1, wherein the male cones (2A, 2B) are clamped together with a space between them and define with one another an interval of fixed maximum length inside of which the female cones (3A, 3B) are housed, whereby the control element (8) forms a spacer that is inserted between said female cones (3A, 3B).

4. Device for braking an elongated rotating body (1) according to claim 3, wherein the male cones (2A, 2B) are connected to one another by parallel rods (9) along which the male cones (2A, 2B) slide in the direction of a drawing-together or a spacing from one another, whereby the rods (9) are provided, at each of their ends, with an axial stop (10) that forms a clamping means with a space between the male cones (2A, 2B).

5. Device for braking an elongated rotating body (1) according to claim 1, wherein the female cones (3A, 3B) are controlled in terms of axial movement and kept from rotating by the common control element (8).

6. Device for braking an elongated rotating body (1) according to claim 1, wherein the female cones (3A, 3B) each carry, on their opposite faces, teeth (11) that form a circular serration, wherein the teeth (11) of said serrations interlock by providing between them a free space (12) for inserting a control portion (13) of the common control element (8).

7. Device for braking an elongated rotating body (1) according to claim 6, wherein the control element (8) is an angular movement control element that has the shape of a fork with two branches (14, 15), wherein each said branch (14, 15) of the fork is provided with an internal radial tooth that forms the control portion (13) of the common control element (8).

8. Device for braking an elongated rotating body (1) according to claim 1, wherein the coaxial conical surface (5) of each said male cone (2A, 2B) is provided with ridges (16).

9. Device for braking an elongated rotating body (1) according to claim 1, wherein each said male cone (2A, 2B) is provided, at a central recess (7) thereof, with axial grooves (17) that are adapted to engage additional grooves that are provided on said body (1).

10. Braking device according to claim 1, wherein the coaxial conical surface (5) of the male cone and the coaxial conical surface (6) of the female cone of each of said pair of cones (2A, 3A; 2B, 3B) have a slope that is identical or approximately identical to an angle α that is selected within the range of 5 to 30°.

11. Transmission for a self-propelled machine that comprises a box (18), and housed at least partially within the box at least one engine input shaft (19), an output shaft (20), and means for transmission of movement between the input shaft (19) and the output shaft (20), wherein the transmission also comprises contained inside the box (18) and acting on one of the input shaft (19), the output shaft (20), and the transmission means, at least one braking device according to claim 1.

12. Device for braking an elongated rotating body (1) according to claim 2, wherein the male cones (2A, 2B) are clamped together with a space between them and define with one another an interval of fixed maximum length inside of which the female cones (3A, 3B) are housed, whereby the control element (8) forms a spacer that is inserted between said female cones (3A, 3B).

13. Device for braking an elongated rotating body (1) according to claim 2, wherein the female cones (3A, 3B) are controlled in terms of axial movement and kept from rotating by the common control element (8).

14. Device for braking an elongated rotating body (1) according to claim 3, wherein the female cones (3A, 3B) are controlled in terms of axial movement and kept from rotating by the common control element (8).

15. Device for braking an elongated rotating body (1) according to claim 4, wherein the female cones (3A, 3B) are controlled in terms of axial movement and kept from rotating by the common control element (8).

16. Device for braking an elongated rotating body (1) according to claim 2, wherein the female cones (3A, 3B) each carry, on their opposite faces, teeth (11) that form a circular serration, wherein the teeth (11) of said serrations interlock by providing between them a free space (12) for inserting a control portion (13) of the common control element (8).

17. Device for braking an elongated rotating body (1) according to claim 2, wherein the coaxial conical surface (5) of each said male cone (2A, 2B) is provided with ridges (16).

18. Device for braking an elongated rotating body (1) according to claim 2, wherein each said male cone (2A, 2B) is provided, at a central recess (7) thereof, with axial grooves (17) that are adapted to engage additional grooves that are provided on said body (1).

19. Device for braking an elongated rotating body according to claim 2, wherein the coaxial conical surface (5) of the male cone and the coaxial conical surface (6) of the female cone of each said pair of cones (2A, 3A; 2B, 3B) have a slope that is identical or approximately identical to an angle α that is selected within the range of 5 to 30°.

* * * * *